Figure 1:
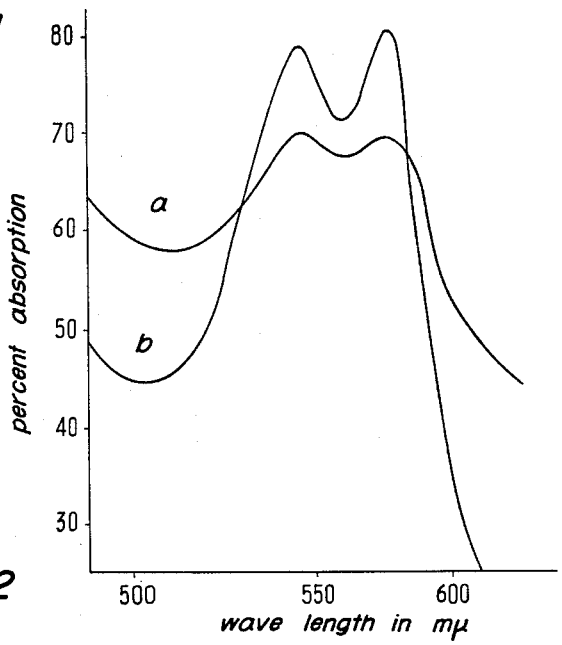

July 7, 1964   RYOZO WATANABE ETAL   3,140,291
PROCESS FOR THE PREPARATION OF COBALTIPROTOPORPHYRIN
Filed July 26, 1961

United States Patent Office 3,140,291
Patented July 7, 1964

3,140,291
PROCESS FOR THE PREPARATION OF
COBALTIPROTOPORPHYRIN
Ryozo Watanabe and Satoshi Funakoshi, both of Gamau-cho, Joto-ku, Osaka, Japan, assignors to The Blood Plasma Corporation of Japan, Joto-ku, Osaka, Japan, a corporation of Japan
Filed July 26, 1961, Ser. No. 126,996
Claims priority, application Japan Apr. 5, 1961
4 Claims. (Cl. 260—314)

This invention relates to a method for preparation of cobaltiprotoporphyrin or complex of metal cobalt and protoporphyrin. The said compound has the following structure, in which a cobaltic ion chelates with nitrogen atoms in four pyrrole rings.

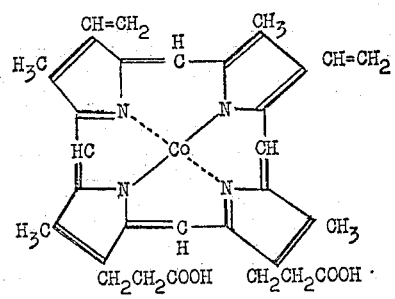

Cobaltiprotoporphyrin was produced by Fischer and Pützer (Z. Physiol. Chem. 154, 39 (1926)). But in their method it is required to heat the reaction mixture at 100° C. to 120° C. At such high temperature the contamination of some by-products which may be produced from over-heating, is unavoidable. Furthermore, the use of much amount of organic solvents, e.g. pyridin and chloroform is quite expensive. In recent years, McConnel et al. (J. Pharma. Pharmaco. 5, 179 (1953)) reported the synthesis of cobaltiprotoporphyrin according to the modification of Laidlaw's method (J. Physiol. 31, 364 (1905)). According to their method, crystals precipitated at the beginning are of cobaltoprotoporphyrin. After separation of the cobaltoprotoporphyrin, it is so difficult to obtain cobaltiprotoporphyrin by oxydation thereof and the yield is so poor that the process overall is also expensive. That is to say, under nitrogen gas flowing condition, the complex between protoporphyrin and cobaltous ion immediately precipitates in acetic acid medium. This precipitate is cobaltoprotoporphyrin which is unstable in solution because of the fact that it is pointed out by the reappearance of red fluorescence of porphyrin that cobaltous ion is released from the complex.

We have found that when the reaction is carried out under aeration, the complex precipitate does not appear in the reaction mixture but cobaltiprotoporphyrin is precipitated, when this mixture is diluted with twice or more volumes of water and adjusted to a pH 5.0. The precipitate is found to be stable in solution.

According to the present invention, in the course of reaction between protoporphyrin and cobaltous acetate in acetic acid medium, acetic acid solution of protoporphyrin is added drop by drop into an absolute acetic acid solution of cobaltous acetate at about 30°–45° C. passing air through the solution. In place of the cobaltous acetate, cobaltous carbonate or cobaltous oxide which are soluble in acetic acid may be used. The end of the reaction is observed by disappearance of fluorescence of protoporphyrin. When the reaction completes, water and caustic alkali are added until pH reaches about 2.5 to precipitate impurities which are filtered off. The filtrate contains the desired product. In this procedure a contamination of free protoporphyrin which was unavoidable in McConnel's method is completely avoidable and the yields of cobaltiprotoporphyrin is able to increase as much as twice of their method.

If the reaction is effected at a temperature higher than 50° C., dark-brown insoluble precipitate comes out, which seems to be a decomposition product and consequently yield of purposed material decreases. The optimum temperature in this reaction is from 35° to 40° C.

Cobaltous compound and protoporphyrin are mixed in the mol ratio of 4.5–7.5 (Co ion):1. Aeration may be effected by compressing air into or sucking. The rate of aeration is 500 cc. of air per min. per litre. Cobaltiprotoporphyrin prepared from pure protoporphyrin under aeration and controlled temperature from 35° C. to 40° C. still contains about 10 percent of impurities. But the impurities are readily separated by an iso-electric precipitating method. The solution obtained from the reaction in acetic acid is diluted by addition of twice volumes of water and adjusted to pH 2.5 with addition of a 40 percent aqueous sodium hydroxide solution. After standing for about 30 minutes, dark-brown precipitate is removed by filtration. Purplish-red filtrate is adjusted again at pH 5.2 by addition of the 40 percent aqueous sodium hydroxide solution and left standing for about one hour till the precipitate which is the desired product completely falls down. On the other hand, the purified red filtrate may be extracted with chloroform or ethyl ether after saturated with sodium chloride to obtain the desired product.

Figure 2:
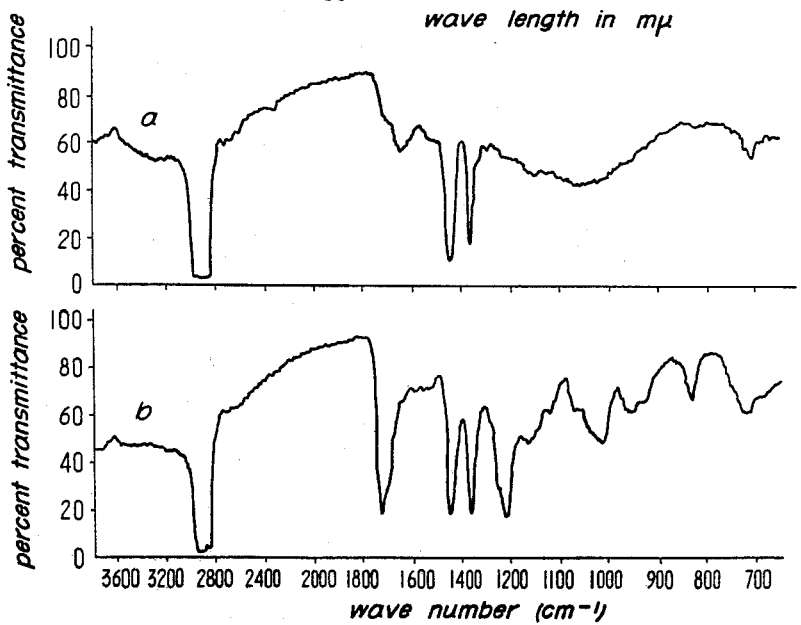

Absorption spectrum observed in NaOH, at pH 12.0 of the first precipitate, which is reprecipitated by the same treatment, is shown in FIG. 1, curve $a$ and infrared spectrum of it is shown FIG. 2, curve $a$. These spectrums are considerably different from those of the second precipitate. Absorption spectrum shown in FIG. 1, curve $b$ and infrared spectrum as shown in FIG. 2, curve $b$ of the second precipitate are completely coincided with that shown in literatures as cobaltiprotoporphyrin. Furthermore, the sharp peaks of curve suggest that the second precipitate has high purity.

Example 1

One liter of glacial acetic acid solution containing 20 g. of cobaltous acetate is stirred under aeration and heated to 40° C. 6 g. of pure protoporphyrin are dissolved into 1.2 liters of 90 percent acetic acid saturated with sodium chloride, and the solution is dropped into the cobaltous acetate solution over a period of 30 minutes, while stirring under aeration and heating. After the addition is completed, the reaction mixture is left standing for longer than 30 minutes at 40° C., but the aeration is stopped in this period. The endpoint of reaction is acknowledged by disappearance of a red fluorescence of free protoporphyrin, which is detected by irradiation of ultraviolet rays of 2734 A. If the fluorescence yet remains in the reacting solution, the reaction is continued at 40° C. until it disappears. After the disappearance of the fluorescence is confirmed, the reaction mixture is filled up with 4 liters of water. And a 10 N aqueous sodium hydroxide solution is then added with stirring in the solution. When the pH has gone up to about 2.5, a brownish black precipitate settles.

After standing for 30 minutes, the precipitate is filtered off. The purplish red filtrate is neutralized with a 10 N aqueous sodium hydroxide solution to about pH 5.2, and after left standing for about 30 minutes purplish red precipitate settled is taken by filtration or centrifugation. The product is washed three times with 1 liter of a 0.01 mole acetate buffer solution in pH 5.2 washed twice with water and dried in vaccuo. 4.2 g. of cobaltiprotoporphyrin is obtained.

($E_{1\,cm.}^{1\%}$=107.67 at 536 m$\mu$, $E_{1\,cm.}^{1\%}$=120.33 at 574 m$\mu$)

*Example 2*

Into a four necked flask, 250 ml. of glacial acetic acid solution containing 5 g. of cobaltous acetate is charged, and one of the necks is fitted with a thermometer, one is joined with a dropping funnel in which there is 500 ml. of a 90 percent acetic acid solution saturated with sodium chloride containing 2.5 g. of protoporphyrin, the remaining two are prepared for an aeration. The flask is heated, and moderate air is led into the flask from a pipe. When the contents in the flask have reached to a temperature of 40° C., protoporphyrin solution is dropped into the flask from the funnel, the dropping rate is controlled so that precipitate does not come out in the reacting solution. After dropping has finished, an aeration is stopped, but the reaction is continued until the fluorescence of protoporphyrin disappears. The temperature is kept at 40° C. all through the reacting period. The reaction mixture is diluted with twice or thrice volumes of water after disappearance of fluorescence by ultraviolet rays at 2734 A., pH is controlled to about 2.5 with a 10 N aqueous sodium hydroxide solution. The precipitate formed is filtered off by the use of Celite Filter Aid No. 503, manufactured and sold by Johns-Manville Sales Corp., New York, N.Y., U.S.A.

The clear scarlet filtrate is corrected to about pH 5.2 with a 10 N aqueous sodium hydroxide solution and shaken with 300 ml. of chloroform or ethyl ether. The extraction is repeated with the solvent until the extracted solution becomes almost colourless.

Usually four to five times of extraction are sufficient. The extraction may be carried out more smoothly when sodium chloride is added in high concentration in the solution. The chloroform or the ether layer is collected and distilled off, then brownish red precipitate remains.

The precipitate is dried at room temperature in an alkalin desiccator. The yield of pure cobaltiprotoporphyrin is about 1.7 g.

($E_{1\,cm.}^{1\%}$=107.67 at 536 m$\mu$, $E_{1\,cm.}^{1\%}$=120.33 at 574 m$\mu$)

What we claim is:

1. A process for preparing cobaltiprotoporphyrin from protoporphyrin and cobaltous salts, comprising holding a mixture of a solution of protoporphyrin in acetic acid with a solution of cobaltous salts in acetic acid under aeration at temperatures ranging from 30° to 45° C., controlling pH of the reaction product thus obtained to 2–2.5, adding at least twice and thrice at the most water, filtering off precipitate formed, adjusting pH of the filtrate to about 5.2 and removing cobaliprotoporphyrin from said filtrate.

2. A process according to claim 1, wherein the temperature of aeration is 35°–40° C.

3. A process according to claim 1 which comprises holding a mixture of a solution of protoporphyrin in 90% acetic acid with a solution of cobaltous salts in glacial acetic acid under aeration at 35°–40° C. until fluorescence of protoporphyrin emitted by ultraviolet ray disappears, controlling pH of the reaction product thus obtained to 2–2.5 by caustic soda, together with addition of water in an amount of at least twice volumes and up to thrice, filtering off the precipitate formed, adjusting pH of the filtrate to about 5.2 to form a precipitate of cobaltiprotoporphyrin.

4. A process according to claim 1 which comprises holding a mixture of a solution of protoporphyrin in 90% acetic acid with a solution of cobaltous salts in glacial acetic acid under aeration at 35°–40° C. until fluorescence of protoporphyrin emitted by ultraviolet ray disappears, controlling pH of the reaction product thus obtained to 2–2.5 by caustic soda together with addition of water in an amount of at least twice volumes and up to thrice, filtering off the precipitate formed, controlling pH of the filtrate to 5.2 and extracting cobaltiprotoporphyrin from said filtrate with a member selected from the group consisting of chloroform and ethyl ether.

References Cited in the file of this patent

FOREIGN PATENTS

| | | |
|---|---|---|
| 178,162 | Austria | Apr. 10, 1954 |
| 368,673 | Great Britain | Mar. 10, 1932 |

OTHER REFERENCES

Albert: Current Trends in Heterocyclic Chemistry, Butterworths Sci. Pub., London (1958), pages 134 and 135.